United States Patent [19]

Ahmad et al.

[11] Patent Number: 4,726,671
[45] Date of Patent: Feb. 23, 1988

[54] HIGH RESONANCE ADJUSTABLE MIRROR MOUNT

[75] Inventors: Anees Ahmad, Bethel; Richard L. Huse, Norwalk, both of Conn.

[73] Assignee: The Perkin-Elmer Corporation, Norwalk, Conn.

[21] Appl. No.: 876,068

[22] Filed: Jun. 19, 1986

[51] Int. Cl.⁴ .............................................. G02B 7/18
[52] U.S. Cl. .................................... 350/633; 350/609
[58] Field of Search ............... 350/633, 632, 631, 609, 350/607, 611, 600, 252; 248/479, 487

[56] References Cited

U.S. PATENT DOCUMENTS

| | | | |
|---|---|---|---|
| 3,334,959 | 8/1967 | Walsh | 350/633 |
| 3,588,230 | 6/1971 | Rieux | 350/634 |
| 3,588,232 | 6/1971 | Mostel | 350/633 |
| 4,023,891 | 5/1977 | Chadwick | 350/634 |
| 4,268,123 | 5/1981 | Mesco | 350/609 |
| 4,420,223 | 12/1963 | Watanabe et al. | 350/631 |
| 4,533,100 | 8/1985 | Paseri | 343/DIG. 2 |
| 4,569,248 | 2/1986 | Hug | 74/581 |

FOREIGN PATENT DOCUMENTS 2903804  8/1980  Fed. Rep. of Germany ...... 350/607

Primary Examiner—Jon W. Henry
Attorney, Agent, or Firm—Thomas P. Murphy; Edwin T. Grimes; Francis L. Masselle

[57] ABSTRACT

A mirror mount wherein the mirror is mounted to the housing through tangent bars. The tangent bars have flexure cut-outs at each end thereof to allow the mirror to move relative to the housing. The housing is mounted through blade flexures to a support structure so as to allow the mirror to be translated along its optical axis.

4 Claims, 3 Drawing Figures

HIGH RESONANCE ADJUSTABLE MIRROR MOUNT

FIELD OF THE INVENTION

The present invention relates to mounting systems for high quality mirrors and, more particuarly, where such mounting systems are very stable, have a high resonance frequency and can be adjusted to vary the optical characteristics of the optical system of which they are a part.

BACKGROUND OF THE INVENTION

In the art of manufacturing semiconductor products through photolithographic processes, the demand for smaller and smaller minimum circuit feature sizes is increasing. Reducing the circuit feature sizes requires more accurate optical systems which, in turn, requires a more stable mount for the system optics having a high resonance frequency.

To date mirrors have been mounted in cells or housings using well known tangent bar techniques. That is, three bars mounted at one end tangent to the outer diameter of the mirror, and mounted at the other end to the mirror housing. Such a technique does provide an effective way to mount a mirror but has drawbacks. Namely, after the mirror is mounted it may be desirable to move the mirror relative to the housing. Such is the case where the mirror must be adjusted relative to the optical system of which it is a part. Such adjustments inevitably impart stresses from the tangent bars to the mirror which distort the surface figure of the mirror. The prior art mounting techniques provide no precedent for mounting mirrors to housings which are at once flexible, stable and have a high resonance frequency.

A further requisite to attaining the high degree of accuracy required in the future generation of photolithography equipment is the ability to adjust the optical characteristics of the system in real time. This requires being able to move one or more optics along its axis during operation of the equipment, without disturbing the relative optical alignment.

While a number of different types of mirror mounts have been employed heretofore with some success, our contribution to the art is a new system which allows a mirror to be moved relative to its mount, is impervious to temperature excursions, has a high resonance frequency and which allows the mirror focus to be adjusted in real time.

BRIEF DESCRIPTION OF THE INVENTION

The many purposes of the present invention are realized by providing a mirror which is mounted to a housing through tangent bars. The tangent bars are characterized by having a pair of circular flexures, mutually orthogonal, located at each end of the tangent bar. Micrometers are provided which act through the housing on the tangent bar to move the mirror out of its plane.

The mirror housing is in turn attached to a main support structure through flat blade flexures. These flat blade flexures allow the housing, hence the mirror, to be moved axially in real time. In this way, the mirror may be moved along its optical axis in real time.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception on which the disclosure is based may readily be utilized as a basis for designing other structures for carrying out the several purposes of the invention. It is important, therefore, that the claims be regarded as including such equivalent structures as do not depart from the spirit and scope of the invention.

Specific embodiments of the invention have been chosen for purposes of illustration and description, and are shown in the accompanying drawings, forming a part of the specification.

DETAILED DESCRIPTION OF THE PREFERRED EMBODIMENTS

Figure 1:
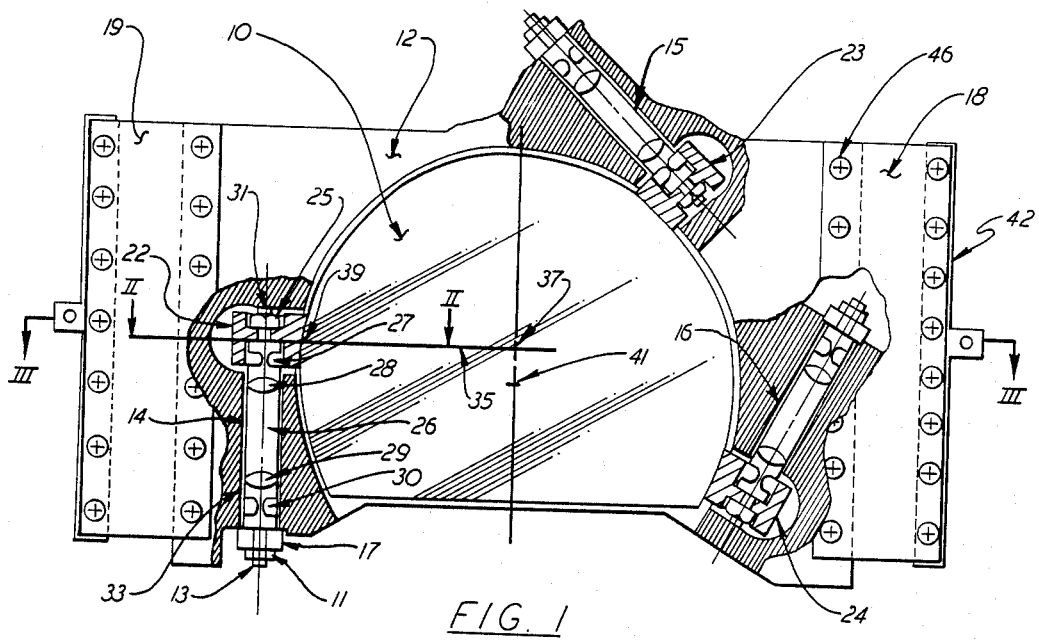
FIG. 1 is a front view of a mirror mounted to a housing through tangent bars in accordance with the present invention.

FIG. 1 shows, in front view, a mirror 10 mounted in a housing 12 in accordance with the present invention. Three tangent bars 14–16 are shown mounted to the mirror 10 through buttons 22–24, respectively. The buttons 22–24 may be of any suitable material, such as invar, having a coefficient of thermal expansion close to that of the mirror 10.

It should be understood that the tangent bars 14–16 are identical. Hence, the detailed description which follows of tangent bar 14 is applicable to tangent bars 15 and 16.

The tangent bar 14 has a rod 26 having a first end 13 and a second end 31. The rod 26 can be of any shape but is preferably cylindrical. Each end 13 and 31 of the rod is threaded to accept nuts 11 and 25, respectively. The first end 13 is attached, through a spacer 17, by nut 11 to the housing 12. The second end 31 is attached to the button 22 by nut 31. The rod 26 is disposed within a bore 33 in the housing. The rod 26 of the tangent bar 14 is oriented relative to the mirror 10 such that a line 35 through the point of tangency 39 of the tangent bar 14 with the mirror 10 goes through the center of gravity 37 of the mirror 10.

The mirror 10 of FIG. 1 is shown, as an example only, as having a center of gravity 37 eccentric from the apex 41 of the mirror 10.

The rod 26 has four pairs of cut-outs 27–30 having a generally circular shape. Each pair of cut-outs 27–30 are machined so as to leave a thin amount of material at the center of the rod 26. Two pairs of the cut-outs 28 and 29 are oriented parallel to each other as are the other two pairs 27 and 30. Cut-out pairs 27 and 30 are oriented perpendicular to cut-out pairs 28 and 29.

By providing cut-out pairs 27–30 having a generally circular shape, the rod 26 is stiff in a direction along its length, that is, in a direction tangent to the mirror 10. Thus the mirror 10, as mounted to the housing through the tangent bars 14–16, has very high resonance frequency in the plane of the mirror 10. Thus, each end of the rod 26 is provided with a universal flexure joint made up of a pair of cut-outs 27 and 28 at one end thereof and a pair of cut-outs 29 and 30 at the other end. These universal flexure joints allow each end of the rod 26 to flex freely in any direction except axially.

The thin section between the cut-out pairs 27–30 allows the rod 26 to bend freely at the cut-outs 27–30. In this way the mirror 10 can be moved freely out of its plane, in a manner described hereinbelow in reference to FIG. 2, without imparting significant stress loads to the mirror 10 through the button 22. By "significant stress loads", we mean such stress loads that will not alter the surface figure of the mirror 10 beyond desired limits.

In addition, the cut-out pairs 27 and 30 allow the housing 12 to expand or contract at a faster rate than the mirror 10 as the entire assembly, as shown in FIG. 1, undergoes changes in the ambient temperature.

Figure 2:
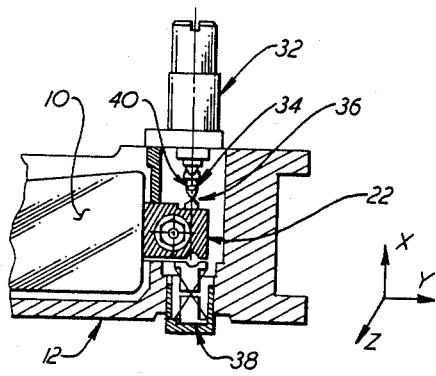
FIG. 2 is a sectional view of the mirror mount of FIG. 1 showing the manner in which the mirror is adjusted relative to the housing.

FIG. 2 is a partial sectional view of the mirror mount of FIG. 1 with the addition of micrometer adjustment means 32.

To move the mirror 10 out of its plane relative to the housing 12, the micrometer 32 of FIG. 2 is provided. The micrometer 32 is affixed to the housing 12 and is attached to the button 22 through a flexure 34. The flexure 34 has two pairs of circular cut-outs, 36 and 40, oriented perpendicular to each other. The mutually perpendicular cut-outs 36 and 40 allow movement of the button 22 relative to the micrometer 32 in the Y and Z directions while stiffness of the actuator 34 in the X direction is retained. Thus, as the micrometer 32 is rotated, the flexure 34 moves in the X direction. In this way the button 22, hence the mirror 10, is moved relative to the housing. The direction of movement of the mirror 10, into or out of the housing, depends on the direction of rotation of the micrometer. A spring 38 is provided to force the button 22 against the flexure 34 to eliminate any backlash in the system.

Each of the tangent bars 14–16 shown in FIG. 1 has an adjustment system, as shown in FIG. 2, associated therewith. Thus the mirror 10 can be moved out of its plane and/or tilted about its center of gravity 37 so as to align it in any desired way with the optical system, not shown, of which it is a part.

Figure 3:
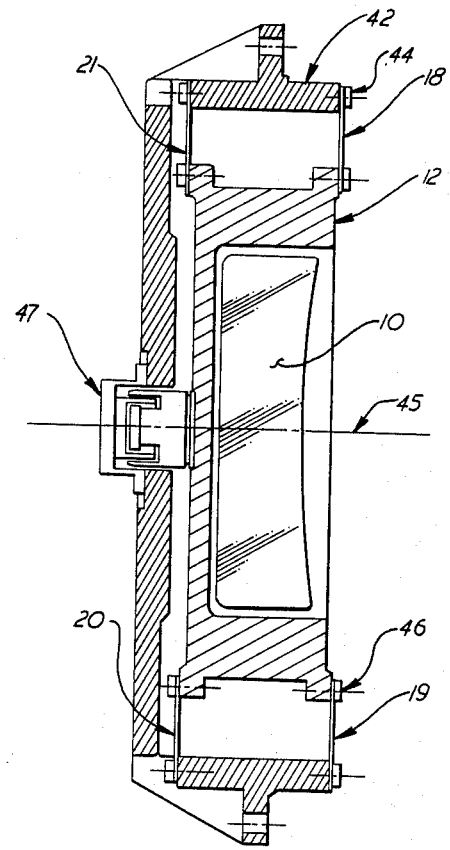
FIG. 3 is a side sectional view of the mirror mount of FIG. 1 shown mounted in a support structure through blade flexures, in accordance with the present invention.

FIG. 3 is a side sectional view of the mirror housing 12 and associated mirror 10 of FIG. 1 shown mounted in a support structure 42 through blade flexures 18–21.

The blade flexures 18–21 are attached to the support structure through, for example, screws 45 and are likewise attached to the housing 12 through, for example, screws 46.

The flexures 18–21 provide a support system which has a high resonance frequency in the plane of the housing 12. Further, the flexures 18–21 resist torsional movement applied thereto in the plane of the housing 12. Movement along the optical axis 45 is relatively free of restrictions.

A linear actuator 47 is provided which is attached to the support structure 42 and acts on the housing 12 to move it along the optical axis 45 relative to the support structure. The flexures 18–21 are so disposed as not to hinder this axial movement. In this way the axial position of the mirror 10, relative to other elements in the optical system of which it is a part, can be adjusted in real time without producing any misalignment.

There has thus been described a high resonance adjustable mirror mount. The mount holds the mirror in a distortion-free state to retain the high-quality figure of the mirror. The mirror can be tilted within its housing and adjusted axially, in real time, to vary the characteristics of the optical system without introducing any misalignment. In addition, the mount in accordance with the present invention provides for thermal compensation between the mirror and its housing.

Having thus described the invention with particular reference to the preferred forms thereof, it will be obvious to those skilled in the art to which the invention pertains, after understanding the invention that various changes and modifications may be made therein without departing from the spirit and scope of the invention, as defined by the claims appended hereto.

What is claimed is:

1. A mirror mount comprising:
   a mirror;
   a housing;
   said mirror being mounted to said housing through three individual tangent bars;
   said individual tangent bars having a first end rigidly affixed to said mirror and a second end rigidly affixed to said housing;
   said individual tangent bars being tangent to said mirror at a tangent pint;
   said individual tangent bars being perpendicular to a line through said tangent point and through the center of gravity of said mirror; and
   each tangent bar having a universal flexure joint at each end thereof.

2. A mirror mount as claimed in claim 1 wherein each said universal flexure joint comprise two pairs of circular cut-outs oriented orthogonal to each other.

3. A mirror mount as claimed in claim 1 wherein said individual tangent bars are mounted to said mirror through a button, said button being of a material having a coefficient of thermal expansion close to that of said mirror.

4. A mirror mount as claimed in claim 1 further comprising:
   a support structure;
   said housing being mounted within said support structure through blade flexures such that said mirror is movable along its optical axis relative to said support structure.

* * * * *